Figure 1:
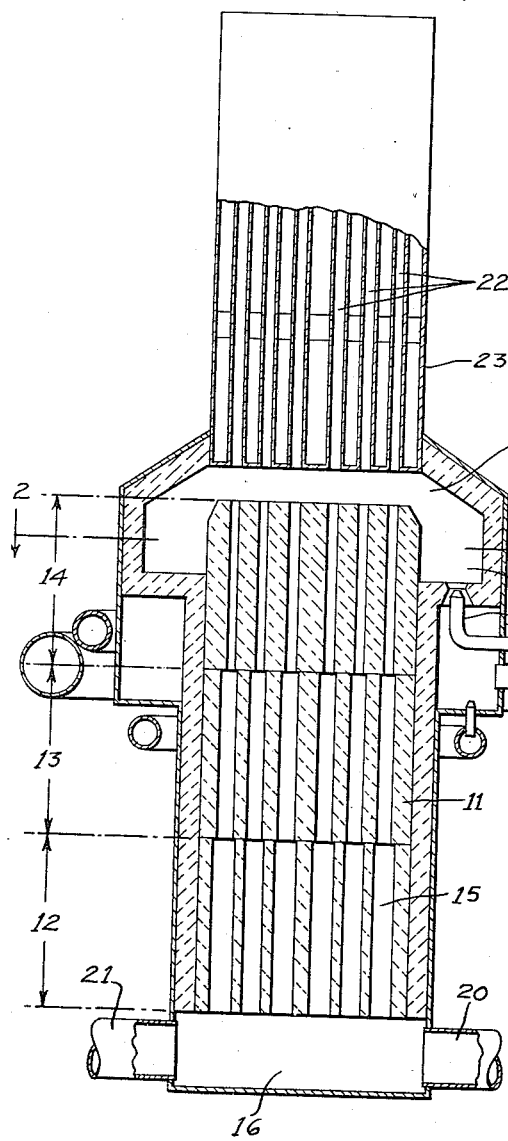

June 1, 1948.  R. L. HASCHE  2,442,460
FURNACE
Filed Dec. 8, 1945

INVENTOR
RUDOLPH LEONARD HASCHE
By HARRIS, KIECH, FOSTER & HARRIS

FOR THE FIRM
ATTORNEYS

Patented June 1, 1948

2,442,460

UNITED STATES PATENT OFFICE 2,442,460

FURNACE

Rudolph Leonard Hasche, Johnson City, Tenn., assignor to Tennessee Eastman Corporation, Kingsport, Tenn., a corporation of Virginia Application December 8, 1945, Serial No. 633,844

1 Claim. (Cl. 23—277)

My invention relates to regenerative furnaces, that is, furnaces which operate upon a recurring cycle and which heat a gas, to be processed, in a regenerative mass of heat refractory material. The cycle includes a firing period, during which heat is imparted to the mass from hot combustion products which are passed in a positive direction, for example, downwardly, through passages formed in the mass for the purpose of transferring heat units from the hot combustion products to the mass, and a treating period, in which a gas which it is desired to heat is passed in a negative direction, for example, upwardly, through the passages.

It is an object of the invention to provide a regenerative mass having passages so formed that the gases and products of combustion have a variable mass velocity as they flow through the passages, moving faster in the upper part of the passages than they do in the lower.

The advantages attained by this form of passage will be made evident hereinafter.

Figure 2:
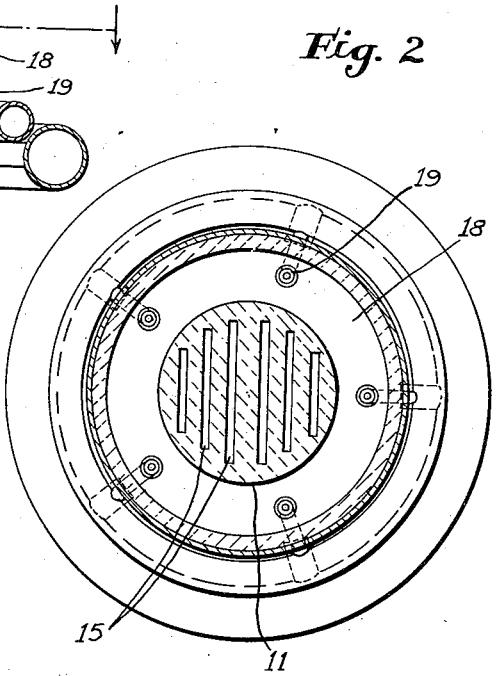

In the drawing, which is for illustrative purposes only,

Fig. 1 is a vertical section through a preferred form of furnace embodying my invention; and Fig. 2 is a horizontal section on a plane identified by the line 2—2 of Fig. 1, this section being viewed in the direction of the arrows adjoining that line.

In the furnace illustrated by the drawing, a regenerative mass of heat resistant material 11, for example, carborundum bricks, is divided roughly into three sections whose length is indicated by the dimensions 12, 13, and 14. The mass is cylindrical, and the bricks are so laid that a plurality of open slots or passages 15 are formed therein, these passages connecting a primary space 16 at one end of the mass 11 with a secondary space 17 at the other end of the mass. In the furnace shown, the slots are vertical, but my invention is equally applicable to furnaces in which the slots are horizontal or extend in any direction. The words "up" and "down" are used hereinafter to describe a vertical furnace, and not as words limiting my invention to any directional disposition of the slots.

The furnace shown operates on a recurrent cycle which includes a firing period and a treating period, each of which may have a duration of perhaps one minute. During the firing period, hot products of combustion produced in a combustion chamber 18 by burners 19 flow downwardly through the slots 15 and escape through a flue 20. During the treating period, gases to be treated introduced into the space 16 through a supply pipe 21 flow upwardly through the slots 15 and pass out of the furnace through tubes 22 of a heat exchanger or boiler 23.

During the firing period, the products of combustion in their downward passage through the slots 15 give up heat to the mass 11. The hot products of combustion first contact the mass in the section 14 when they are hottest and most capable of giving up heat. The regenerative mass 11 is a reservior for this heat, and by making the slots 15 progressively wider from the top to the bottom of the mass, I not only increase the velocity of the gases passing upwardly through the slots in the section 14 during the treating period over the velocity in the sections 12 and 13, but I also provide a greater heat storage capacity around each slot in proportion to the area of the slot in the section 14 than I do in the section 12. For example, in the section 14, the slots may be ¼" wide and the walls between the slots 1¼" thick, or the walls are five times as thick as the slots are wide; in the section 13 the slots may be ⅜" wide and the walls 1⅛" thick, or the walls are three times as thick as the slots are wide; and in the section 12 the slots may be ½" wide and the walls 1" thick, or the walls are only twice as thick as the slots are wide. The gases move upwardly twice as fast in the section 14 as they do in the section 12.

This construction is of considerable value when the gases react in the section 14 and absorb heat during the reaction, for example, when the furnace is used to produce acetylene, ethylene, or similar hydrocarbons from stock hydrocarbon raw materials delivered through the pipe 21. In such operations the reaction absorbs heat and takes place only after the gases reach a minimum critical temperature somewhere in their upward passage through the slots 15. The gases enter these slots at atmospheric temperature and emerge at a temperature of perhaps 2700° F. The reaction may not start to take place until the gases are quite close to this temperature, and during the reaction heat must be rapidly and continuously supplied to enable it to continue as the conversion absorbs large amounts of heat. The speed with which the conversion takes place is probably proportional to the speed with which this heat can be supplied. By making the slots narrow and the walls thick, I provide more heat storage capacity in the section 14 than in the section 12 and get the heat into the gas faster than with wider slots and thinner walls. In producing acetylene, the gas need be in the reaction zone less than one-tenth of a second, which is important, as the acetylene is a transient product and changes to undesired products very rapidly. By using a relatively high velocity in the zone 14 and rapidly cooling the gases in the boiler 23, I prevent a large part of such undesired reactions.

The capacity of any such furnace is also an inverse function of the pressure drop through the mass 11; the higher this drop, the lower the capacity of the furnace is. By making the slots in the section 14 of the proper size to produce the proper reaction, and by making the slots in the sections 13 and 12 wider, the pressure drop is reduced from that which would occur if the slots 15 were the same size in the sections 13 and 12 that they are in the section 14.

In making acetylene, the top or hot end of the regenerative mass may be 3000° F. and the bottom or cold end only 900° F.

A very important advantage of increasing velocity and heating the regenerative mass from bottom to top is the accelerated heat requirement in the treatment of the charging stock as the temperature is raised. The ideal condition is approached since increasing the velocity increases almost proportionately the heat transfer from the regenerative mass to the hydrocarbon undergoing treatment, and the greater mass of refractory supplies the required heat. The same relative advantages are realized during the heating cycle. Requisite amounts of heat are stored in the proper portions of the furnace.

Other structural features which may be employed to advantage in conjunction with the apparatus of the present invention are shown and described in applicant's copending applications Serial No. 633,839, now Patent No. 2,432,885, issued December 16, 1947, and Serial No. 633,843, both filed December 8, 1945.

I claim as my invention:

A regenerative furnace comprising a first chamber providing a primary space; an inlet communicating with said first chamber for admitting gas to be treated during a treating cycle; an outlet communicating with said first chamber for the escape of products of combustion during a heating cycle; a second chamber spaced from said first chamber, forming a substantially annular combustion space; a plurality of burners opening into said combustion space; and an outer shell enclosing an elongated upright regenerative mass having continuous rectangular passageways extending lengthwise therethrough in communication with said annular combustion chamber at one end of said regenerative mass and in communication with said primary space at the opposite end of said regenerative mass, said regenerative mass having greatest volume and greatest heat storage capacity at the end thereof in proximity to said combustion space and said rectangular passageways being of smallest cross section at the ends thereof in proximity to said combustion space.

RUDOLPH LEONARD HASCHE.

REFERENCES CITED

The following references are of record in the file of this patent:

UNITED STATES PATENTS

| Number | Name | Date |
|---|---|---|
| 2,232,121 | Linder | Feb. 18, 1941 |